(12) United States Patent
Braunbeck et al.

(10) Patent No.: US 7,810,868 B2
(45) Date of Patent: Oct. 12, 2010

(54) MOTOR VEHICLE FRAME STRUCTURE AND CRASHBOX THEREFOR

(75) Inventors: Bardo Braunbeck, Oppenheim (DE); Theobald Hock, Grossostheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 15 days.

(21) Appl. No.: 12/061,382

(22) Filed: Apr. 2, 2008

(65) Prior Publication Data

US 2008/0238142 A1 Oct. 2, 2008

(30) Foreign Application Priority Data

Apr. 2, 2007 (DE) ........................ 10 2007 015 865

(51) Int. Cl.
*B60J 7/00* (2006.01)
(52) U.S. Cl. .................................. 296/187.03; 293/133
(58) Field of Classification Search ............ 296/187.03; 293/102, 120, 155; 52/656.9; 285/369; 410/67, 410/49
See application file for complete search history.

(56) References Cited

U.S. PATENT DOCUMENTS

| | | | |
|---|---|---|---|
| 3,633,934 A | | 1/1972 | Wilfert |
| 6,814,381 B1 * | | 11/2004 | Frank ........................ 293/133 |
| 7,188,877 B2 * | | 3/2007 | Gonzalez et al. ............ 293/133 |
| 7,357,432 B2 * | | 4/2008 | Roll et al. ................... 293/133 |
| 7,407,206 B2 * | | 8/2008 | Arns et al. .................. 293/133 |
| 7,494,167 B2 * | | 2/2009 | Braunbeck et al. .......... 293/133 |
| 7,503,603 B2 * | | 3/2009 | Braunbeck et al. .......... 293/133 |
| 7,533,913 B2 * | | 5/2009 | Bae ............................ 293/133 |
| 7,631,924 B2 * | | 12/2009 | Nilsson ...................... 296/133 |
| 2005/0253403 A1 * | | 11/2005 | Longo ........................ 293/133 |
| 2008/0217935 A1 * | | 9/2008 | Braunbeck et al. .......... 293/132 |
| 2009/0001737 A1 * | | 1/2009 | Salomonsson ............... 293/133 |
| 2009/0026777 A1 * | | 1/2009 | Schmid et al. .............. 293/133 |
| 2009/0261602 A1 * | | 10/2009 | Karlander ................... 293/132 |

FOREIGN PATENT DOCUMENTS

| | | |
|---|---|---|
| DE | 102005021663 B3 | 5/2006 |
| DE | 202005008321 U1 | 6/2006 |
| DE | 102005021661 A1 | 11/2006 |
| DE | 102006019653 A1 | 11/2006 |

(Continued)

OTHER PUBLICATIONS

European Patent Office, European Search Report for European Application No. 08003317.8, May 8, 2009.

(Continued)

*Primary Examiner*—Kiran B. Patel
(74) *Attorney, Agent, or Firm*—Ingrassia Fisher & Lorenz, P.C.

(57) ABSTRACT

A crashbox is provided for connecting a bumper carrier and a longitudinal beam in a frame structure of a motor vehicle. The crashbox has a section that is compressible in a longitudinal direction and a first fixing element for attachment to the longitudinal beam and a second fixing element for attachment to the bumper carrier at opposite ends of the section. The first fixing element is in the form of a spigot member that is insertible into a cavity in the longitudinal beam and a support strut extends between two rigid side flanks of the spigot member through an internal cavity of the spigot member.

18 Claims, 4 Drawing Sheets

FOREIGN PATENT DOCUMENTS

| | | |
|---|---|---|
| DE | 102005029738 A1 | 12/2006 |
| DE | 102005051764 A1 | 5/2007 |
| DE | 102006019654 A1 | 11/2007 |
| DE | 102006025856 A1 | 12/2007 |
| WO | 2007121896 A2 | 11/2007 |

OTHER PUBLICATIONS

German Patent Office, German Search Report for German Application No. 102007015865.5, Dec. 6, 2007.

* cited by examiner

MOTOR VEHICLE FRAME STRUCTURE AND CRASHBOX THEREFOR

CROSS-REFERENCE TO RELATED APPLICATION

This application claims priority to German Patent Application No. 102007015865.5, filed Apr. 2, 2007, which is incorporated herein by reference in its entirety.

TECHNICAL FIELD

The present invention relates to a crashbox and a motor vehicle frame structure utilizing such a crashbox.

Crashboxes are conventionally built into a motor vehicle frame structure between the longitudinal beams thereof and a bumper carrier in order to absorb impact energy by the deformation thereof in the event of a none too severe collision and thereby prevent the possibility of one of the longitudinal beams being deformed. Deformation of a longitudinal beam is only reparable, if at all, at high cost.

It is conventional for such a crashbox to have a boxlike structure with walls that extend as an extension of the longitudinal beam and are structured such as to be compressed in bellows-like manner in the event of an impact, and also flanges which are aligned transversely relative to these walls and serve for the attachment of the crashbox to a bumper carrier and an end face of the longitudinal beam.

The construction of the frame structure could be simplified if the crashbox could be fixed to the longitudinal beam, not with the help of mutually opposite flanges, but rather, by sticking a spigot member of the crashbox into a cavity in the longitudinal beam which, conventionally, is usually in the form of a hollow square section. In order to effectively protect the longitudinal beam from deformation in the event of a collision, it is necessary to introduce the forces arising during the collision into the longitudinal beam such that they are distributed as uniformly as possible over the cross section thereof. This is more difficult in the case of a plugged-in crashbox than it is for one mounted in conventional manner by means of flanges since the force-distributing and compensatory effect of the flanges no longer exists. Consequently, for the purpose of compensation, it is important to produce a close contact between the flanks of the spigot member and the longitudinal beam over a large surface area.

However, in order to enable the spigot member to be inserted, the cross section thereof must be somewhat smaller than that of the cavity accommodating it. When this is the case however, the spigot member cannot touch the opposite walls of the cavity at the same time and introduce force into them.

In order to fulfil these contradictory demands, it is necessary to expand the spigot member following its initial introduction into the cavity with a degree of play. Experiments have shown however, that the spread-out side flanks of the spigot member are driven towards one another again by the deformation occurring during a collision and tend to bend the opposing walls of the longitudinal beam to which they are attached towards each other. This must be avoided as the crashbox would otherwise lose its purpose.

There is therefore a need for a crashbox which can be easily and economically installed on the one hand but which nevertheless ensures effective protection of the longitudinal beam from deformation on the other. In addition, other objects, desirable features and characteristics of the present invention will become apparent from the subsequent detailed summary, description, abstract, and the appended claims, taken in conjunction with the accompanying drawings and this background.

SUMMARY

In accordance with the invention, at least one object is achieved in that, in the case of a crashbox for connecting a bumper carrier and a longitudinal beam in a frame structure of a motor vehicle which comprises a section that is compressible in a longitudinal direction and a first fixing element for attachment to the longitudinal beam and a second fixing element for attachment to the bumper carrier at opposite ends of this section, wherein the first fixing element is in the form of a spigot member that can be inserted into a cavity of the longitudinal beam, a support strut extends between two rigid side flanks of the spigot member through an internal cavity of the spigot member. The support strut limits the compliance of the spigot member in the face of a force that is effective from the compressible section and drives the flanks of the spigot member towards each other so that a closing movement of the flanks such as would exceed the bounds of the resilient ductility of the longitudinal beam can be prevented.

In order to enable the spigot member to be introduced into the cavity of the longitudinal beam with a certain amount of play on the one hand but nevertheless enable the flanks thereof to come into close contact with the walls of the longitudinal beam on the other, provision can be made according to a first embodiment for the support strut to comprise at least one section that is connected to one of the flanks and unconnected to the respective other flank. In consequence, the support strut does not hinder the spreading of the flanks of the spigot member when attaching it to the longitudinal beam. A deformation of the spigot member by a movement of the flanks towards one another is however limited by the support strut.

According to a second embodiment, the two flanks are indeed connected to one another by the support strut, but the support strut incorporates a predetermined break point in order to enable the flanks to spread apart when assembling the crashbox.

The support strut is preferably a web member extending in the direction in which the spigot member is inserted.

In order to provide the crashbox with a closed external shape on the one hand and yet enable the flanks thereof to spread apart on the other hand, the spigot member preferably comprises an outer skin that is expandable in a direction perpendicular to the side flanks.

The possibility for such expansion can be created, in particular, in that the outer skin has a corrugated shape in a section connecting the two side flanks.

In order to provide for a simple and inexpensive manufacturing process, the outer skin is expediently joined to the compressible section in material-uniting, preferably, one-piece manner.

According to a preferred embodiment which is realizable from a small number of inexpensive individual parts, the side flanks each comprise one of two mutually opposite webs of an H-shaped profile, and the support strut is formed by a centre web member of this profile.

An exemplary embodiment also includes a frame structure for a motor vehicle comprising at least one longitudinal beam and a bumper carrier which is attached to the longitudinal beam by a crashbox of the type described above. If the side flanks of the spigot member are attached to opposite walls of a cavity of the longitudinal beam and thereby spread apart, a gap will exist between a section of the support strut connected to one of the flanks and the respectively oppositely located flank or a section of the support strut connected to this flank. In the case where the spigot member of the crashbox originally exhibited a predetermined break point, the gap is formed at the location of this predetermined break point.

The attachment of the spigot member to the longitudinal beam is preferably effected with the aid of bolts which pass through the opposite walls of the longitudinal beam and the flanks of the spigot member.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
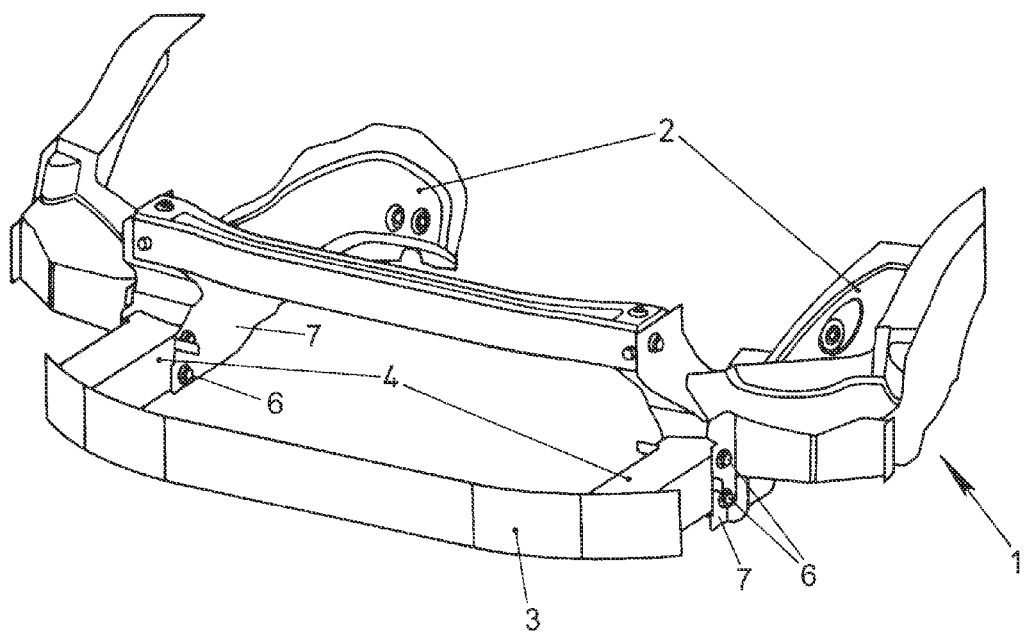
FIG. 1 shows a perspective view of a part of the frame structure of a motor vehicle in accordance with the present invention.
Figure 2:
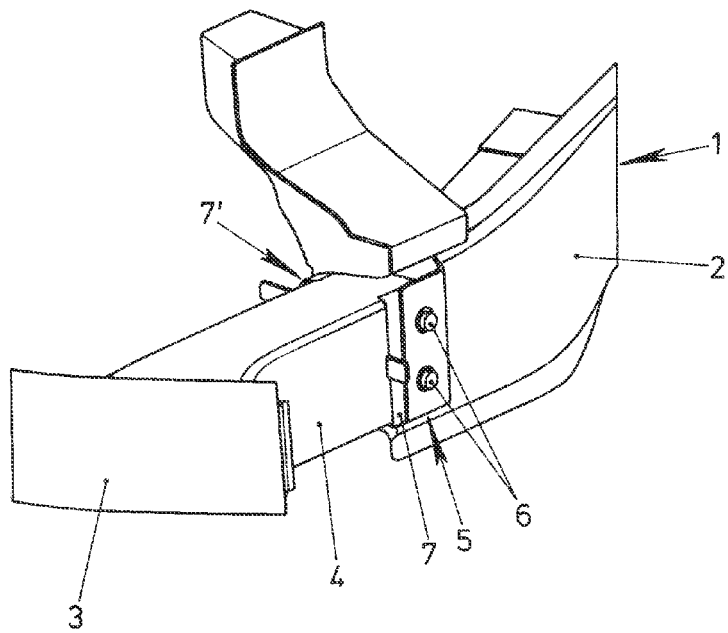
FIG. 2 shows an enlarged sectional view of the frame structure shown in FIG. 1.

FIG. 1 shows a perspective view of a part of the frame structure 1 of a motor vehicle chassis with longitudinal beams 2 and a bumper cross beam 3. Crashboxes 4 are arranged in the form of an extension of the longitudinal beams 2 between the bumper cross beam 3 and the longitudinal beams 2. The bumper cross beam 3 can be the carrier of a front bumper or a rear one. The longitudinal beam 2 is substantially tubular with a rectangular cross section and has open longitudinal ends into which a respective spigot member of the crashbox 4 is inserted, said spigot member being hidden in FIGS. 1 and 2. The spigot member is anchored to the longitudinal beam 2 with the aid of bolts 6 which extend through borings in the mutually opposite side walls 7 of the beam.

Figure 3:
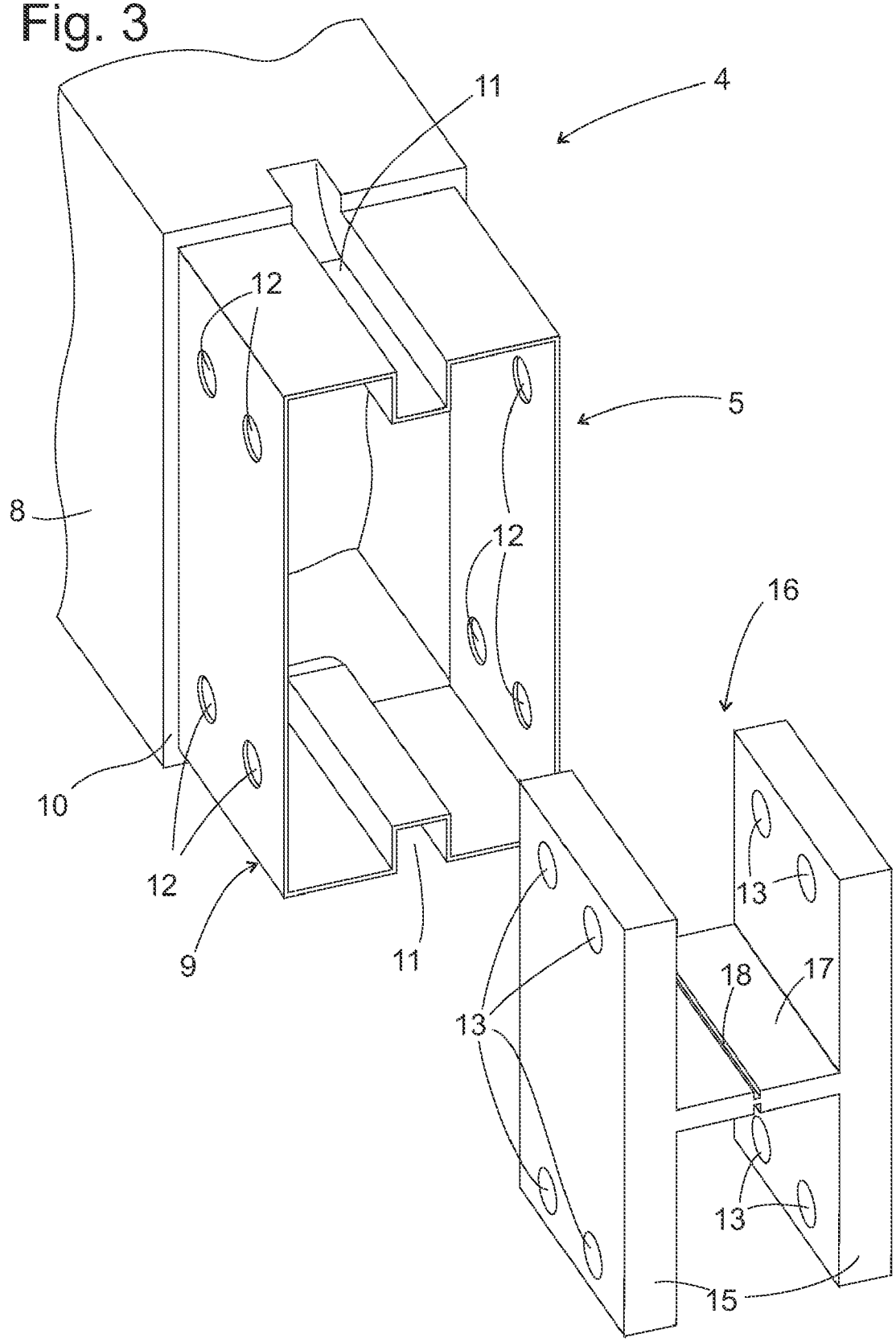
FIG. 3 shows a perspective exploded view of an end of the crashbox in accordance with the present invention.

FIG. 3 shows a perspective view of a part of the crashbox 4 including the spigot member that is to be introduced into the cavity of the longitudinal beam 2 and is designated by 5 herein. The crashbox 4 comprises a compressible main section 8 which is only partly illustrated in FIG. 3 and is substantially in the form of a tubular member having a typical length of about 20 to 25 cm and a rectangular cross section. At an end thereof which is not illustrated in FIG. 3, the main section 8 is closed by a plate-like flange which serves for attachment to a complementary flange of the bumper cross beam 3. At the end thereof shown in FIG. 3, the main section 8 is extended in one-piece manner by a sleeve 9, the height and width dimensions of which are somewhat smaller than those of the main section. When the spigot member 5 is inserted into the longitudinal beam 2, a peripheral shoulder 10 between the main section 8 and the sleeve 9 serves as a stop which limits the depth of penetration of the spigot member 5 into the longitudinal beam 2.

The sleeve 9 has a substantially horizontal upper and lower wall in each of which a groove 11 extending in the longitudinal direction is formed.

Side walls 14 of the sleeve 9 are provided with bolt holes 12.

Corresponding bolt holes 13 are formed in two lateral webs 15 of an H-profile piece 16 which is intended to be placed inside the sleeve 9 in contact with the side walls 14 thereof. A predetermined break point 18, at which the material thickness of a web member 17 is less than that of the surrounding area, is formed in the central web member 17 of the profile piece. The length of the profile piece 16 amounts, in like manner to that of the sleeve 9, to approximately 50 mm; it consists of a solid, but brittle metal, preferably an aluminium alloy.

Figure 4:
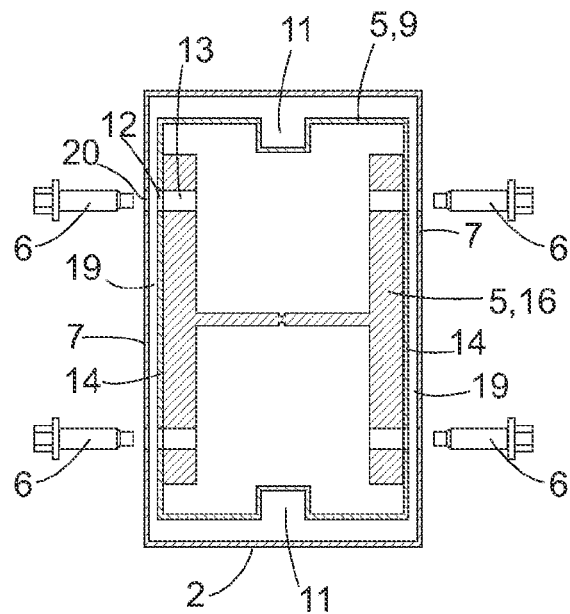
FIG. 4 shows a cross section through the spigot member of the crashbox when inserted into a longitudinal beam, prior to the attachment of the crashbox to the longitudinal beam.

FIG. 4 shows a sectional view through the sleeve 9 and the profile piece 16 placed therein, these together forming the spigot member 5, and also a view through the longitudinal beam 2 accommodating the spigot member 5. The spigot member 5 is accommodated in the longitudinal beam 2 with a certain degree of play in the height and width directions. There is a gap 19 of a few millimetres in width between the respective side walls 7 and 14 of the longitudinal beam 2 and the sleeve 9.

Figure 5:
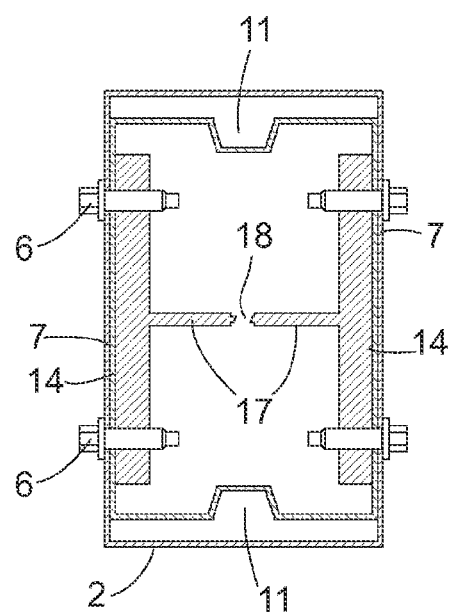
FIG. 5 shows a cross section analogous to FIG. 4 in the attached state.

In order to attach the crashbox 4 to the longitudinal beam 2, the bolts 6 are pushed through the bolt holes 20 in the longitudinal beam 2 and the bolt holes 12 in the sleeve 9 and screwed into an internal thread in the bolt holes 13 in the profile piece 16. The tensile force of the bolts 6 that is consequently effective on the profile piece 16 eventually leads to rupture of the profile piece 16 at the predetermined break point 18, and the sleeve 9 is widened at the level of the grooves 11 as can be seen in FIG. 5. In this way, a more intimate, snug-fitting and frictional contact between the side walls 14, 7 of the sleeve 9 and the longitudinal beam 2 is obtained, this thereby enabling uniform introduction of compressive forces into the longitudinal beam 2 in the event of a collision.

Figure 6:
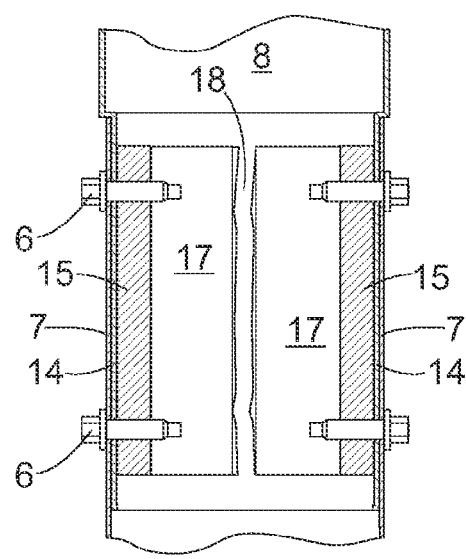
FIG. 6 shows a longitudinal section through the spigot member and the tip of the longitudinal beam accommodating the spigot member in the attached state.
Figure 7:
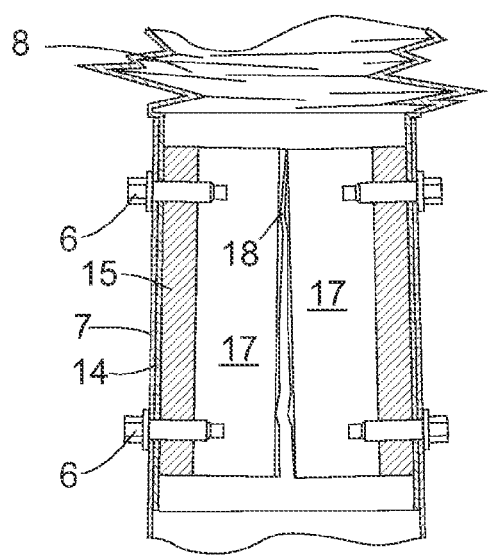
FIG. 7 shows a longitudinal section analogous to FIG. 6, which represents the state after a collision.

In like manner to FIG. 5, FIG. 6 shows the installed spigot member 5 with its ruptured predetermined break point 18, but this time in the form of a horizontal sectional view. A corresponding sectional view after a collision and compression of the main section 8 of the crashbox 4 is shown in FIG. 7. The forces arising from the deformation of the main section 8 drive the side walls 14 of the sleeve 9 towards one another, but the side walls 14 can only move so far towards one another, namely, until the two fragments of the central web member 17 meet together. As can be seen in FIG. 7, this does of course also lead to a slight deformation of the tip of the longitudinal beam 2, but this deformation cannot be greater than the total width of the gap 19 prior to the bolting of the crashbox 4 to the longitudinal beam 2. Thus, insofar as the width of this gap 19 is selected small enough, it can be ensured that the deformation of the longitudinal beam 2 does not exceed the elastic limit thereof. It is thus sufficient to merely loosen the bolts 6 for the longitudinal beam 2 to return to its original shape. The repair work required to the frame structure after a none too severe a collision can therefore be restricted to the crashboxes 4 thereof and possibly also the bumper cross beam 3.

In the illustration of FIGS. 4, 5, the predetermined break point 18 occupies only a small fraction of the total width of the central web member 17 and one might assume that, in the event of upsetting of the crashbox 4, the two fragments of the central web member 17 would separate apart in the vertical direction and thus be able to slide above one another, this thereby substantially negating the supporting effect of the central web member 17 in the event of a collision. However, experiments have shown that such a process of sliding above one another does not occur, but instead, the irregularly formed mutually facing edges of the fragments hook together and actually prevent such a separating movement.

Figure 8:
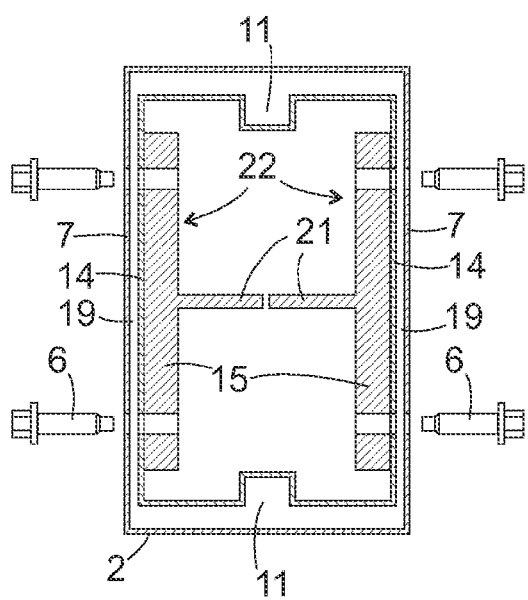
FIG. 8 shows a sectional view in accordance with a modified embodiment of the invention, analogous to FIG. 4.
Figure 9:
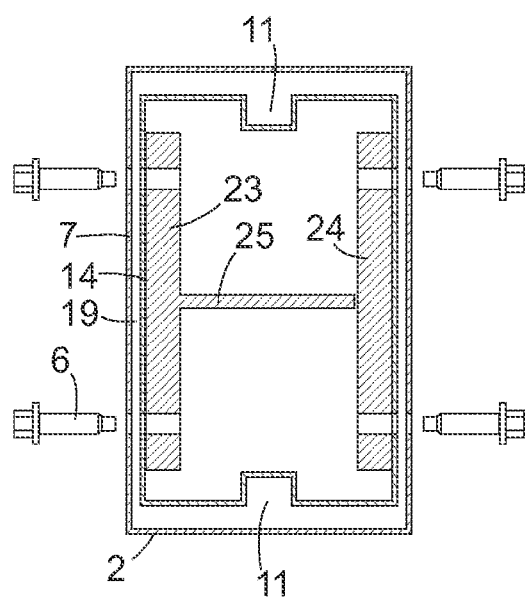
FIG. 9 shows a further sectional view in accordance with a modified embodiment of the invention, analogous to FIG. 4.

FIGS. 8 to 9 show modified embodiments of the invention each analogous to the sectional view of FIG. 4. In FIG. 8, the H-profile piece 16 depicted in FIG. 4 is replaced by two T-section profiles 22 which are mutually arranged as a mirror-image, whereby the crossbar of the T corresponds to a respective one of the lateral webs 15 and the foot 21 of the T to a respective one of the fragments of the central web member 17. That is to say, the essential difference between the embodiment of FIG. 8 and those of FIGS. 4 to 7 lies in the fact that it is not an individual component having a predetermined break point such as the H-profile piece 16 which is used for stabilizing the shape of the spigot member 5, but rather, two completely separate components are used from the very beginning. The omission of the predetermined break point 18 does of course ease the task of tightening the bolts 6, but does not simplify the assembly process overall due to the larger number of parts that have to be handled. Moreover, as the irregularly serrated, mutually jamming contours of the predetermined break point 18 are omitted, the feet 21 must be of a somewhat greater material thickness than the web member 15 in order to prevent the two feet 21 from being pushed above one another in the event of a collision.

The possibility of such a displacement above one another is excluded in the embodiment of FIG. 9. Here, the spigot member 5 is reinforced by a T-shaped profile piece 23 and a plate-shaped profile piece 24, whereby the foot 25 of the T-section profile 23 extends into the direct proximity of the plate-shaped profile piece 24. However, due to the large length, larger deformation moments can occur on the foot 25 than on the feet 21 of FIG. 8 so that here too, an increased material thickness may be necessary in order to ensure sufficient form stability.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A crash box assembly for connecting a bumper of a motor vehicle to a longitudinal beam of the motor vehicle, the crash box assembly comprising:
    a main section configured to compress in a longitudinal direction of the motor vehicle;
    a spigot member extending from the main section in the longitudinal direction of the motor vehicle, the spigot member being configured for insertion into a cavity of the longitudinal beam, the spigot member including a sleeve adapted for attachment to the longitudinal beam, the sleeve having an internal cavity and the sleeve being configured to spread in a lateral direction of the motor vehicle when attached to the longitudinal beam, and the sleeve being configured to expand further in the lateral direction such that side walls of the sleeve and the longitudinal beam come into contact with each other in the event of a collision; and
    an at least one piece member configured for insertion into the internal cavity of the sleeve and adapted for attachment to the sleeve and to the longitudinal beam, the at least one piece member being further configured to expand in the lateral direction of the motor vehicle when the sleeve expands and to generally inhibit a deformation of the spigot member by a movement of the sidewalls of the sleeve toward one another in the event of a collision.

2. The crash box assembly of claim 1, wherein the sleeve is configured to fit within a cavity in the longitudinal beam.

3. The crash box assembly of claim 1, wherein the sleeve includes a corrugated slot to permit expanding of the sleeve in the lateral direction of the motor vehicle when the sleeve is attached to the longitudinal beam.

4. The crash box assembly of claim 1, wherein the sleeve includes a pair of oppositely disposed corrugated slots to permit expanding of the sleeve in the lateral direction of the motor vehicle when the sleeve is attached to the longitudinal beam.

5. The crash box assembly of claim 1, wherein the main section defines a peripheral shoulder around a substantial portion of the sleeve.

6. The crash box assembly of claim 1, wherein the sleeve defines a plurality of sleeve bolt holes, wherein the at least one piece member defines a plurality of member bolt holes, wherein the member bolt holes are configured to align with the sleeve bolt holes when the at least one piece member is inserted into the internal cavity of the sleeve and wherein the member bolt holes are configured to engage bolts.

7. A crash box assembly for connecting a bumper of a motor vehicle to a longitudinal beam of the motor vehicle, the crash box assembly comprising:
    a main section configured to compress in a longitudinal direction of the motor vehicle; and
    a spigot subassembly extending from the main section in the longitudinal direction of the motor vehicle, the spigot subassembly including:
        a sleeve adapted for attachment to the longitudinal beam, the sleeve having an internal cavity and the sleeve being configured to expand in a lateral direction of the motor vehicle when attached to the longitudinal beam, and
        an H-profile piece configured for insertion into the internal cavity of the sleeve and adapted for attachment to the sleeve, the H-profile piece including a weak region configured to break to permit expansion of the H-profile piece in the lateral direction of the motor vehicle when the sleeve expands, the H-profile piece being further configured to generally inhibit compression of the sleeve in the lateral direction of the motor vehicle.

8. The crash box assembly of claim 7, wherein the sleeve is configured to fit within a cavity in the longitudinal beam.

9. The crash box assembly of claim 7, wherein the sleeve includes a corrugated slot to permit expansion of the sleeve in the lateral direction of the motor vehicle when the sleeve is attached to the longitudinal beam.

10. The crash box assembly of claim 7, wherein the sleeve includes a pair of oppositely disposed corrugated slots to permit expansion of the sleeve in the lateral direction of the motor vehicle when the sleeve is attached to the longitudinal beam.

11. The crash box assembly of claim 7, wherein the main section defines a peripheral shoulder around a substantial portion of the sleeve.

12. The crash box assembly of claim 7, wherein the sleeve defines a plurality of sleeve bolt holes, wherein the H-profile piece defines a plurality of H- profile piece bolt holes, wherein the H-profile piece bolt holes are configured to align with the sleeve bolt holes when the H-profile piece is inserted into the internal cavity of the sleeve and wherein the H-profile bolt holes are configured to engage bolts.

13. A crash box assembly for connecting a bumper of a motor vehicle to a longitudinal beam of the motor vehicle, the crash box assembly comprising:
   a main section configured to compress in a longitudinal direction of the motor vehicle; and
   a spigot subassembly extending from the main section in the longitudinal direction of the motor vehicle, the spigot subassembly including:
      a sleeve adapted for attachment to the longitudinal beam, the sleeve having an internal cavity and the sleeve being configured to expand in a lateral direction of the motor vehicle when attached to the longitudinal beam, and
      an H-profile piece configured for insertion into the internal cavity of the sleeve and adapted for attachment to the sleeve, the H-profile piece comprising a pair of lateral web members joined by a central web member, the central web member having a thinned portion which defines a weak region configured to break into two broken central web members to permit expansion of the H-profile piece in the lateral direction of the motor vehicle when the sleeve expands, the H-profile piece being further configured to generally inhibit compression of the sleeve in the lateral direction of the motor vehicle through interference of the two broken central web members with each other.

14. The crash box assembly of claim 13 wherein the thinned portion comprises a groove defined in the central web member.

15. The crash box assembly of claim 13 wherein the thinned portion comprises a pair of aligned grooves defined in opposite sides of the central web member.

16. The crash box assembly of claim 7, wherein the sleeve is configured to fit within a cavity in the longitudinal beam.

17. The crash box assembly of claim 7, wherein the sleeve includes a pair of oppositely disposed corrugated slots to permit expansion of the sleeve in the lateral direction of the motor vehicle when the sleeve is attached to the longitudinal beam.

18. The crash box assembly of claim 7, wherein the main section defines a peripheral shoulder around a substantial portion of the sleeve.

\* \* \* \* \*